United States Patent Office 2,835,609
Patented May 20, 1958

2,835,609
METHOD FOR COATING CELLULOSE ESTER FILMS

Clemens B. Starck, Gale F. Nadeau, and Carl F. Smith, Rochester, N. Y., assignors to Eastman Kodak Company, Rochester, N. Y., a corporation of New Jersey No Drawing. Application June 24, 1954
Serial No. 439,142

5 Claims. (Cl. 117—73)

This invention relates to a laminar film or sheet structure. More particularly this invention concerns a thin film or sheet of a laminated construction containing in its make-up a cellulose ester layer and a polyvinyl alcohol layer.

Our Nadeau and Starck Patent 2,362,580 patented November 14, 1944, shows in some detail film or sheet structures of the aforementioned laminar type and the manufacture and use of such structures. As set forth in the aforementioned patent from the same laboratories as the instant invention, such laminar film or sheet structure is useful for various photographic purposes as well as for optical purposes and the like. Also, certain laminated film structures are shown in Nadeau Patents 2,169,004 and 2,133,110. Likewise these patents disclose various uses for laminated film products as well as combinations of materials and methods of manufacture for obtaining such laminated films or sheets. While the process and products of the aforementioned patents have been very useful and serviceable in the art, it is apparent that the development of simpler and faster methods of manufacture, as well as lower cost laminated film of this general type, represents a highly desirable result.

After extensive investigation we have found a faster method of manufacturing laminated film or sheeting of the same general type as referred to in the aforementioned patents and we have been able to produce a product which has particular merit in certain respects.

This invention has for one object to provide a more rapid and simpler method for the manufacture of laminated film or sheets of the class indicated. Still another object is to provide a more rapid method for the manufacture of laminated films or sheets containing cellulose ester and polyvinyl alcohol components in their make-up. A still further object is to provide a method of making laminated films and sheets of the class indicated, whereby the coating speed employed in making such laminated structure may be increased several hundred percent. Still a further object is to provide a new species of laminated film or sheet containing cellulose ester and polyvinyl alcohol in its make-up. Other objects will appear hereinafter.

We have found that laminated film or sheet of the class described may be made at increased coating speeds by the employment of certain combinations of materials for the coating composition, which materials are deposited from certain solvent combinations. That is, we have found that certain combinations of ingredients not only serve to produce the desired layers on the film or sheet to give laminated sheeting having a wide variety of uses, but we have discovered combinations of ingredients and solvents which lend themselves to relatively rapid coating, thereby permitting much faster manufacture of laminated film or sheet of the aforementioned type.

In the broader aspects of our invention, cellulose ester base, preferably a mixed ester base such as cellulose acetate butyrate, is used to receive the coating. This base material, either preformed or as withdrawn from the drying chambers in film or sheet manufacture, is fed into contact with coating devices in series. In the first coating device a certain solid-solvent combination is applied. The manner of application may be by a bead applicator, briefly described as follows: A small roll is set in a shell containing the solution. The device is raised until the liquid brought up on the revolving small roll forms a bead with the base material. Other methods of applying the coating may be used, such as dipping the cellulose ester base in a pan of the subbing solution, or by spraying the base material with the coating composition. After briefly curing this coating, all of which operations by virtue of the nature of the coating lend themselves to rapid operation, the coated sheet is then conducted into contact with another coating device, either a bead coater or any of the others just mentioned, where a second coating is applied. This second coating contains polyvinyl alcohol and certain other components and solvents which lend themselves to rapid operation. The resultant laminar film, after curing, is wound up in a conventional manner.

A further understanding of our invention will be had from consideration of the following examples which are set forth for illustrating our preferred embodiment.

Example I

In this example, the base of our laminar film structure was comprised of .005" acetate butyrate clear sheeting which, in addition to its cellulose acetate butyrate content, contained 7 parts per 100 by weight of triphenyl phosphate. This base was passed in contact with a bead coater wherein the following composition was applied:

| | Percent |
|---|---|
| Gelatin | 1.25 |
| Cellulose nitrate | 0.30 |
| Glacial acetic acid | 1.00 |
| Chromic chloride (based on weight of gelatin) | 1.50 |
| Acetone | 50.00 |
| Water | 3.00 |
| Methyl alcohol | Balance |

This first coating was of a thickness of about $1 \times 10^{-5}$".

The sheet, while receiving the first coat, passed over a rotating metal drum heated to 50° F. The sheet was then further cured by passing through compartments in which the air is heated from 160° F. to 240° F.

The cured sheet was then passed in contact with a second coating apparatus where there was applied a coating of the following ingredients:

| | Percent |
|---|---|
| Polyvinyl alcohol (Elvanol type 90–25) | 0.5 |
| Saponin (based on weight of PVA) | 5.0 |
| Zirconium nitrate (based on weight of PVA) | 5.0 |
| Methyl alcohol | 55.0 |
| Water | Balance |

This coating was of a thickness of about $6 \times 10^{-5}$". The film during this second coating was in contact with a heated drum of the aforementioned type, heated to a temperature of approximately 105° F. The coating set-up rapidly because of its special formulation.

The speed of production of laminated film in accordance with this example was between 1½ to 4 times faster than the speed of production of similar laminated film containing cellulose ester and polyvinyl alcohol components.

The ingredients specified in the above formulas are in most instances well-known chemical materials, hence an extended description thereof is unnecessary. However, further description concerning compositions of cellulose nitrate, polyvinyl alcohol and the like are set forth in the aforementioned patents.

We have found the first coating, which contains chromic chloride and ketone-alcohol-solvent, sets up very rapidly, thereby facilitating higher speed operation. In connection with the coating, the saponin component facilitates the application of this coating from the solvent which, as set forth above, consists of alcohol and water.

Example II

In accordance with this example the film base or sheet used was approximately a .0065" preformed sheet of cellulose acetate having an acetyl content between 42½ and 44%. The sheet in addition to the cellulose acetate contained by weight about 15% triphenyl phosphate and 15% methox. The first coating applied by the bead method contained:

| | Percent |
|---|---|
| Gelatin | 1.75 |
| Cellulose nitrate | 0.5 |
| Glacial acetic acid | 1.00 |
| Chromic chloride (based on weight of gelatin) | 1.50 |
| Acetone | 50.00 |
| Water | 3.00 |
| Methyl alcohol | Balance |

The first coating was of a thickness of about $1 \times 10^{-5}$". The sheet while being coated was passed over a heated drum of a temperature in the neighborhood of 50° F. The sheet thus coated was then coated with a layer of polyvinyl alcohol of the same composition as shown in Example I. Thereafter the laminated sheet passed over a drum at a temperature of a little over 100° F. The resultant laminated sheet was bonded to optical material and tested for strength. It was found that the bonds not only of the laminated sheet but of the laminated sheet to the optical material were well over that required for satisfactory commercial use.

Example III

In this example the base sheet was cellulose acetate butyrate similar to that described in Example I. The first coating contained gelatin, acetic acid, chromic chloride, acetone, methanol and water as in Example I. However, the cellulose nitrate component was replaced with cellulose acetate butyrate up to 0.6%. This acetate butyrate had an acetyl content of about 29-30%, a butyl of about 17-18% and about 1.4% hydroxyl. The second coat was approximately the same as already described. The resultant laminated sheet of cellulose acetate butyrate base, carrying a layer of cellulose acetate butyrate, which carried the polyvinyl alcohol layer was produced at a higher rate of speed than the prior type laminated structures. Tests of the resultant laminated film indicated that it was more than strong enough for commercial usage.

In the above examples the thickness of the support or base component may vary between say .004 and .01". The thickness of the first coating may vary between $5 \times 10^{-6}$" and $3 \times 10^{-5}$". The thickness of the polyvinyl alcohol containing layer may be between $4 \times 10^{-5}$" and $1 \times 10^{-4}$". While there can be some variation in the solvent proportions, for rapid operation as described and for the production of sufficiently strong bonds between the laminates, we prefer that the acetone proportions be between 50-70% with corresponding reduction in the methyl alcohol content. The gelatin content together with the other solid components of the first coat may vary from about 0.6% to 2%. The total solids of the second coat can be varied from about .5 to 1.5%.

In place of chromium chloride we may use formaldehyde.

In place of zirconium nitrate we may use chromic nitrate. The acetic acid component in the first coating may be completely or partially substituted by trifluoroacetic or glycolic acids. In conjunction with or in place of saponin we may use agents such as polyglyceryl monolaurate usually in an amount of $\frac{1}{10}$ to $\frac{1}{100}$ of the weight of the polyvinyl alcohol constituent. As indicated above, the cellulose nitrate content may be partially or wholly replaced by cellulose acetate butyrate (as in Example III) or by cellulose acetate. This cellulose acetate should have an acetyl content of about 40% and about a 3% hydroxyl content. The heating on the first drum indicated above as about 50° F., can vary between 50° F. and 120° F. Likewise the 100° F. temperature of the second drum can vary between 85° F. and 150° F.

Films produced in accordance with the foregoing procedure not only may be produced at much higher rates of manufacture than films of the same general type have heretofore been produced, but such films are particularly useful in the photographic and optical industries. For example, the laminated sheeting in accordance with Example I is particularly adapted for receiving a polarized layer on the polyvinyl alcohol surface, which layer may be applied by any of the methods presently in commercial use. Not only is excellent adhesion obtained to such a polarizing layer, but a product having the desired optical properties results. In similar manner various other layers may be applied to the laminar film above described having utility in the photographic industry, for example, a gelatinous composition containing light-sensitive silver salts is readily received by the laminated film structures of the present invention. Good adhesion and good flexibility in the resultant product are present.

We claim:

1. The method of manufacturing a laminated sheet at relatively high manufacturing speeds, which comprises providing a support of a thickness of about .005" which support consists of cellulose acetate butyrate containing triphenyl phosphate, applying to this support a coating consisting of gelatin 1.25-1.75%, cellulose nitrate .3-.5%, chromic chloride (based on the weight of gelatin) 1.5%, contained in a solvent comprised of acetone 50-75%, and methyl alcohol 25-45%, setting up this coating by contact of the coated sheet with a heated surface at a temperature of about 50° F., further curing this coated sheet by passage through air heated from 160° F.–240° F., applying a second coating over this first coating, said second coating consisting of the solids polyvinyl alcohol, saponin and zirconium nitrate in an amount between .5 to 1.5%, deposited from a liquid environment consisting of about equal parts of methyl alcohol and water, subjecting this coated sheet to contact with a heated surface at a tempearture of 105° F., and winding up the finished laminated sheet.

2. The method of manufacturing a laminated sheet at relatively high manufacturing speeds, which comprises providing a support of a thickness between about .004 to .007", which support consists of cellulose ester containing a plasticizer from the group consisting of triphenyl phosphate and methox, applying to this support a coating consisting of solids in an amount between 0.6-2% comprising gelatin 1.25-1.75%, a cellulose ester from the group consisting of cellulose nitrate, cellulose acetate butyrate and cellulose acetate having an acetyl content of about 40% and about a 3% hydroxyl content, .3-.5%, chromic chloride (based on the weight of gelatin) 1.5%, contained in a solvent consisting of acetone between 50-75% and methyl alcohol 25-45%, setting up this coating by contact of the coated sheet with a heated surface together with further curing of this sheet by passage through air heated from 160° F.–240° F., applying a second coating over this first coating, said second coating consisting of the solids polyvinyl alcohol, saponin and zirconium nitrate in an amount between .5 to 1.5%, deposited from a liquid environment consisting essentially of methyl alcohol and water, subjecting this coated sheet to contact with a heated surface to set up the lastmentioned coating, and winding up the finished laminated sheet.

3. The method of manufacturing a laminated sheet at relatively high manufacturing speeds, which comprises providing a support of a thickness of about .004" and .01" which support is comprised at least 70% of a cellulose ester, applying to this support a coating comprising gelatin 1.25–1.75%, a cellulose ester from the group consisting of cellulose nitrate, cellulose acetate butyrate and cellulose acetate having an acetyl content of about 40% and about a 3% hydroxyl content, .3–.5%, a hardening agent from the group consisting of chromic chloride and formaldehyde (based on the weight of gelatin) 1.5%, contained in a solvent of acetone between 50–75% and methyl alcohol 25–45%, setting up this coating by heat, applying a second coating over this first coating, said second coating containing the solids polyvinyl alcohol, saponin and a compound from the group consisting of zirconium nitrate and chromic nitrate, in an amount between .5 to 1.5%, deposited from a liquid environment consisting principally of methyl alcohol and water, subjecting this coated sheet to heat for setting up the coating, and winding up the finished laminated sheet.

4. The method of manufacturing a laminated sheet at relatively high manufacturing speeds, which comprises providing a support of a thickness between .004" and .01", which support consists of a cellulose ester from the group consisting of cellulose acetate and cellulose acetate butyrate containing plasticizer, applying to this support a coating which will set up very rapidly, comprising gelatin 1.25–1.75%, cellulose nitrate .3–.5% and a small amount of chromic chloride, contained in a volatile solvent consisting essentially of a lower aliphatic ketone and alcohol, setting up this coating by heat, then applying a second coating over this first coating, said second coating containing small amounts of the solids polyvinyl alcohol, an agent from the group consisting of saponin and polyglyceryl monolaurate for facilitating the application of this second coating, and an agent from the group consisting of chromic nitrate and zirconium nitrate, in an amount between .5 to 1.5%, deposited from a volatile liquid environment, consisting principally of a solvent from the group consisting of lower aliphatic alcohol and ketone, subjecting this coated sheet to heat to set up the coating, and winding up the finished laminated sheet.

5. The method of manufacturing a laminated sheet at relatively high manufacturing speeds, which comprises providing a thin support, which support consists of cellulose ester containing a plasticizer, applying to the support a coating consisting of solids in an amount between 0.6–2% said solids consisting of gelatin, cellulose ester and a hardener for the gelatin from the group consisting of chromic chloride and formaldehyde, said solid being carried in a volatile liquid environment consisting principally of a solvent from the group consisting of lower aliphatic alcohol and ketone, setting up this coating by heat, applying a second coating over the first coating, said second coating consisting of the solids polyvinyl alcohol, a spreading agent from the group consisting of saponin and polyglyceryl monolaurate, a setting agent for the polyvinyl alcohol from the group consisting of zirconium nitrate and chromic nitrate, deposited from a volatile liquid environment of the same character as aforesaid, subjecting this coated sheet to contact with heat, and winding up the polyvinyl alcohol coated sheet.

References Cited in the file of this patent
UNITED STATES PATENTS

| | | |
|---|---|---|
| 1,345,184 | Hochstetter | June 29, 1920 |
| 2,362,580 | Nadeau et al. | Nov. 14, 1944 |
| 2,368,287 | Chilton | Jan. 30, 1945 |
| 2,455,936 | Lowe | Dec. 14, 1948 |
| 2,578,282 | Bliss | Dec. 11, 1951 |